(12) United States Patent
Wall

(10) Patent No.: US 12,007,054 B2
(45) Date of Patent: *Jun. 11, 2024

(54) HYDRAULIC COUPLING DEVICE AND METHOD OF MOUNTING THE SAME

(71) Applicant: STEELWRIST AB, Sollentuna (SE)

(72) Inventor: Axel Wall, Knivsta (SE)

(73) Assignee: STEELWRIST AB, Sollentuna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,133

(22) Filed: Nov. 16, 2022

(65) Prior Publication Data

US 2023/0079538 A1 Mar. 16, 2023

Related U.S. Application Data

(63) Continuation of application No. 16/644,690, filed as application No. PCT/SE2018/050899 on Sep. 7, 2018, now Pat. No. 11,788,660.

(30) Foreign Application Priority Data

Sep. 8, 2017 (SE) .................................. 1751092-6

(51) Int. Cl.
*F16L 37/34* (2006.01)
*E02F 9/22* (2006.01)
(Continued)

(52) U.S. Cl.
CPC ................ *F16L 37/34* (2013.01); *E02F 9/22* (2013.01); *F16L 21/08* (2013.01); *F16L 37/088* (2013.01)

(58) Field of Classification Search
CPC ......... F16L 37/34; F16L 37/32; F16L 37/088; F16L 21/08; E02F 9/20; E02F 9/22
See application file for complete search history.

(56) References Cited

U.S. PATENT DOCUMENTS 2,451,441 A 10/1948 Main
2,457,251 A 12/1948 Main
(Continued)

FOREIGN PATENT DOCUMENTS

CN 204592532 8/2015
GB 2072792 10/1981
(Continued)

OTHER PUBLICATIONS

NPL "Parent Claims"—the most current claims of copending/parent U.S. Appl. No. 16/644,690, filed May 23, 2023 by the Applicant (Steelwrist AB / Axel Wall). (Year: 2023).*

*Primary Examiner* — David Colon-Morales
(74) *Attorney, Agent, or Firm* — DUANE MORRIS LLP; Gregory M. Lefkowitz; Randall C. Pyles

(57) ABSTRACT

A hydraulic coupling device includes a female coupling unit comprising a female coupling body, a holding block, a guiding ring, and an expanding ring for fixedly arranging the female coupling unit to the holding block 50 in an opening of the holding block, wherein the guiding ring comprises an outer surface for fixedly arranging the guiding ring to the holding block, wherein a seat is provided in the opening for supporting the expanding ring, wherein the female coupling unit is adapted to be fixedly arranged to the holding block by being suspended between the guiding ring and the seat, wherein the expanding ring is arranged as a support between the female coupling unit and the seat.

15 Claims, 6 Drawing Sheets

(51) Int. Cl.
    *F16L 21/08*    (2006.01)
    *F16L 37/088*   (2006.01)

(56) References Cited

U.S. PATENT DOCUMENTS

| | | | |
|---|---|---|---|
| 2,476,929 A | | 7/1949 | Edward |
| 2,841,429 A | | 7/1958 | Mccuistion |
| 2,951,713 A | | 9/1960 | Nilsson |
| 2,958,544 A | * | 11/1960 | Wurzburger ............ F16L 37/34 137/614.03 |
| 2,983,533 A | | 5/1961 | Tisch |
| 3,052,478 A | | 9/1962 | Horvereid |
| 3,073,342 A | | 1/1963 | Magorien |
| 3,120,968 A | | 2/1964 | Calvin |
| 3,196,897 A | | 7/1965 | Frederick |
| 3,201,151 A | | 8/1965 | Westveer |
| 3,285,283 A | | 11/1966 | Calvin |
| 3,334,659 A | | 8/1967 | Magorien |
| 3,380,476 A | * | 4/1968 | Torres ................... F16L 37/002 102/373 |
| 3,417,781 A | * | 12/1968 | Gregg ..................... F16L 37/34 137/614.04 |
| 3,464,436 A | | 9/1969 | Bruning |
| 3,513,887 A | | 5/1970 | Limandri |
| 3,613,726 A | * | 10/1971 | Torres ..................... F16L 37/23 285/86 |
| 3,645,294 A | * | 2/1972 | Allread ................... F16L 37/34 137/614 |
| 3,809,122 A | | 5/1974 | Berg |
| 3,918,492 A | | 11/1975 | Karcher |
| 4,068,863 A | | 1/1978 | Lasko |
| 4,269,389 A | | 5/1981 | Ekman |
| 4,289,164 A | | 9/1981 | Ekman |
| 4,373,551 A | * | 2/1983 | Shindelar ............... F16L 37/32 137/614.04 |
| 4,429,713 A | | 2/1984 | Walter |
| 4,448,447 A | | 5/1984 | Funk |
| 4,572,515 A | | 2/1986 | Grazioli |
| 4,596,272 A | | 6/1986 | Medvick |
| 4,645,245 A | | 2/1987 | Cunningham |
| 4,685,490 A | | 8/1987 | Medvick |
| 4,690,436 A | | 9/1987 | Hehl |
| 4,733,692 A | | 3/1988 | Kotake |
| 4,896,697 A | * | 1/1990 | Stromdahl ............... F16L 37/34 137/614 |
| 4,903,730 A | * | 2/1990 | Otsuki .................... F16L 37/34 137/614.04 |
| 4,924,909 A | * | 5/1990 | Wilcox ................... F16L 37/34 137/614.05 |
| 4,991,627 A | | 2/1991 | Nix |
| 5,123,446 A | * | 6/1992 | Haunhorst .............. F16L 37/23 137/614 |
| 5,159,955 A | | 11/1992 | Ekman |
| 5,179,976 A | | 1/1993 | Boland |
| 5,215,122 A | * | 6/1993 | Rogers ................... F16L 37/34 251/149.6 |
| 5,316,347 A | | 5/1994 | Arosio |
| 5,322,331 A | | 6/1994 | Waldschmidt |
| 5,398,723 A | | 3/1995 | Allread |
| 5,404,901 A | * | 4/1995 | Pickrell ................ B67D 7/0294 222/400.7 |
| 5,464,042 A | * | 11/1995 | Haunhorst .......... F24F 13/0209 137/614.04 |
| 5,494,073 A | | 2/1996 | Saito |
| 5,546,985 A | * | 8/1996 | Bartholomew ......... F16L 37/34 251/149.6 |
| 5,626,520 A | | 5/1997 | Mazziotti |
| 5,662,141 A | | 9/1997 | Arosio |
| 5,709,243 A | | 1/1998 | Wells |
| 5,896,889 A | | 4/1999 | Menard |
| 5,975,589 A | | 11/1999 | Wilkins |
| 5,996,624 A | * | 12/1999 | Ekman .................... F16L 37/34 137/614.04 |
| 6,007,106 A | | 12/1999 | Wilkins |
| 6,158,717 A | | 12/2000 | Van Scyoc |
| 6,206,040 B1 | * | 3/2001 | Smith, III .............. F16L 37/34 137/614.04 |
| 6,328,348 B1 | * | 12/2001 | Cornford ................ F16L 37/34 285/305 |
| 6,371,443 B1 | | 4/2002 | Imai |
| 6,523,863 B2 | | 2/2003 | Ishiwata |
| 6,588,452 B2 | * | 7/2003 | Marquart ................ F16L 37/35 137/614 |
| 6,659,130 B2 | | 12/2003 | Arosio |
| 6,866,064 B2 | | 3/2005 | Nanni |
| 7,159,616 B2 | * | 1/2007 | Watson ................. F16L 29/007 251/149.6 |
| 9,194,634 B2 | * | 11/2015 | Tiberghien .............. F16L 37/34 |
| 9,291,293 B2 | | 3/2016 | Prust |
| 9,791,087 B2 | | 10/2017 | Boothe |
| 9,879,811 B2 | | 1/2018 | Gennasio |
| 9,903,520 B2 | | 2/2018 | Gennasio |
| 9,958,101 B2 | | 5/2018 | Gennasio |
| 10,215,319 B2 | | 2/2019 | Gennasio |
| 10,253,912 B2 | | 4/2019 | Danelli |
| 10,352,460 B2 | | 7/2019 | Jang |
| 2004/0244848 A1 | | 12/2004 | Maldavs |
| 2011/0272046 A1 | | 11/2011 | Peattie |
| 2014/0261819 A1 | | 9/2014 | Vranish |
| 2016/0040815 A1 | | 2/2016 | Gennasio |
| 2016/0061370 A1 | | 3/2016 | Gennasio |
| 2017/0321836 A1 | | 11/2017 | Danelli |
| 2020/0284387 A1 | * | 9/2020 | Wall ...................... F16L 21/08 |
| 2021/0310594 A1 | | 10/2021 | Ramaswamy |

FOREIGN PATENT DOCUMENTS

| | | |
|---|---|---|
| WO | 2006043921 | 4/2006 |
| WO | 2014002065 | 1/2014 |

* cited by examiner

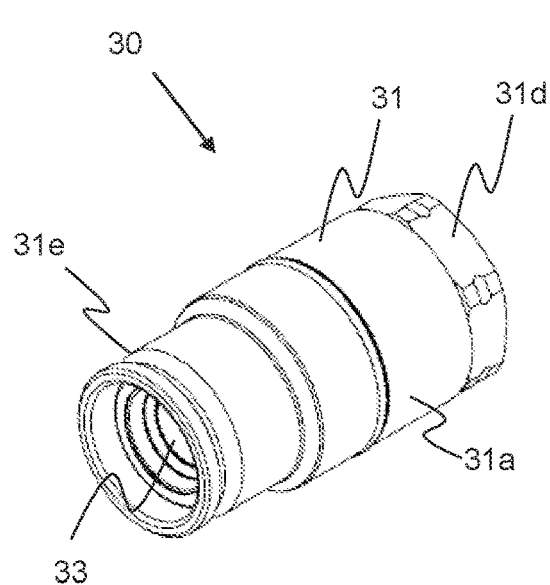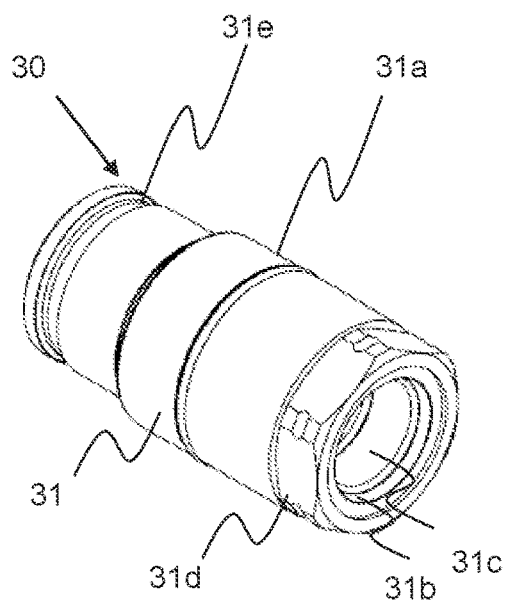
Fig. 4a　　　　　　　　　　Fig. 4b
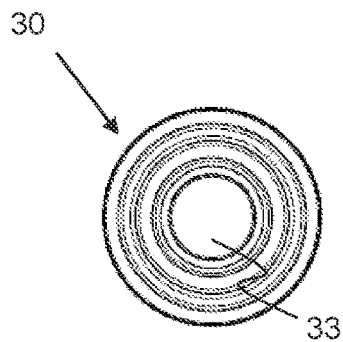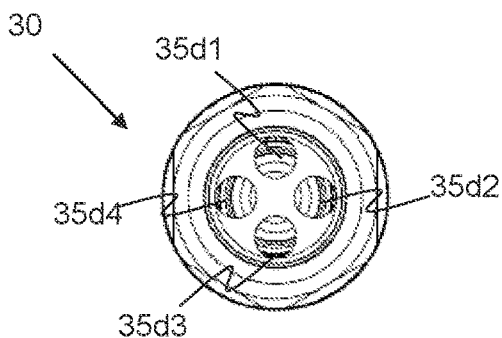
Fig. 4c　　　　　　　　　　Fig. 4d
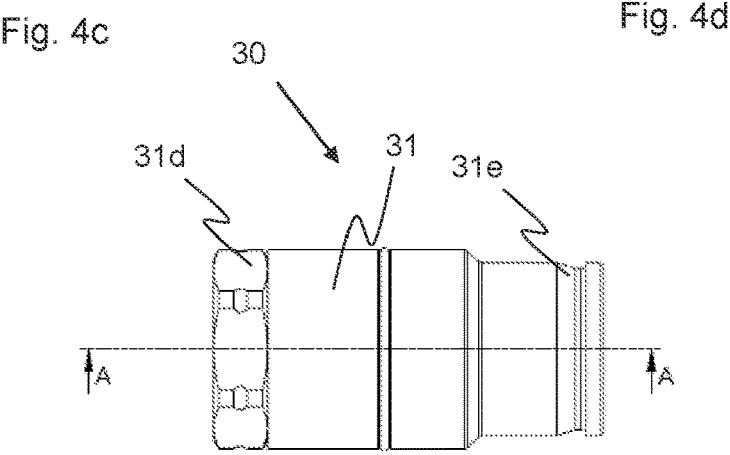
Fig. 4e

HYDRAULIC COUPLING DEVICE AND METHOD OF MOUNTING THE SAME

CROSS REFERENCE TO RELATED APPLICATIONS

This application is a continuation of U.S. Utility patent application Ser. No. 16/644,690, filed on Mar. 5, 2020, which is a § 371 national stage entry of International Patent Application PCT/SE2018/050899, filed Sep. 7, 2018, which claims priority to Swedish Patent Application No. 1751092-6, filed Sep. 8, 2017, the entire contents of which are incorporated herein by reference.

TECHNICAL FIELD

The present invention relates generally to a hydraulic coupling device and male and female coupling units for a hydraulic coupling device.

BACKGROUND ART

It is known to use hydraulic coupling devices for enabling the quick connection between working machines and a variation of hydraulically operated tools. Generally, hydraulic coupling devices comprises a female coupling unit and male coupling unit adapted to matingly engage with each other. One coupling unit, usually the female coupling unit, is arranged to the working machine via a holding block. The male coupling unit is usually arranged in a tool. The respective coupling units are adapted to provide a seal against leakage of hydraulic fluid during non-use, i.e. when not connected to each other, by the aid of valve devices. Upon connection, the valves are opened and hydraulic fluid is allowed to flow between the working machine and the hydraulically operated tool. Further, the valve device comprises a fixedly mounted part and a poppet device movable in relation to the fixedly mounted part with a spring connecting the poppet device and the fixedly mounted part. The fixedly mounted part is arranged to the inner part of the male coupling unit via circlip.

A drawback of known solutions is that the valve device of the male coupling unit comprises multiple parts which are cumbersome and time-consuming to assemble. The guidance between the poppet device and the fixedly mounted part is poor and solely enabled via a guide pin, whereby the poppet device may be tilted in relation to the fixedly mounted part. A further drawback is thus that, as a result, the circlip may be brought out of its position, whereby all valve device parts are released and either become stuck in the male coupling unit causing malfunction of the valve device and leakage of hydraulic oil during non-use, or moves into the hydraulic flow causing malfunction of the tool. Alternatively, during tilting, the poppet device become stuck in the male coupling unit with similar negative results as above.

Yet another drawback of known solutions is that the sealing rings used in the female and male coupling units, so-called o-rings, provide unsufficient sealing capacity, as well as require additional means and assembly steps for fixation as their flexibility otherwise may cause the o-rings to release undesirably from their position causing leakage and malfunction of the tools as they enter the hydraulic flow.

SUMMARY OF INVENTION

An object of the present invention is to alleviate some of the disadvantages of the prior art and to provide a hydraulic coupling device which requires less parts and is easier to assemble. A further object of the present invention is to provide a hydraulic coupling device that reduces risk of malfunction of the device or the hydraulically operated tools connected thereto, hence provide a more reliable hydraulic coupling device.

According to one embodiment of the invention, a male coupling unit for a hydraulic coupling device is provided, comprising a male coupling body comprising a hollow core comprising a male coupling body center axis extending in a male coupling body extension direction, wherein the male coupling body comprises an inner surface wherein the male coupling body further comprising a poppet valve device arranged in the hollow core, wherein the poppet valve device comprises a poppet device, a guide device, and a spring device, wherein a first end of the spring device is supported by the poppet device and a second end of the spring device is supported by the guide device, wherein the poppet device is movable in relation to the guide device along the male coupling body extension direction between an open and closed position upon compression and extension of the spring device respectively, wherein the guide device is locked in the male coupling body extension direction, wherein the inner surface comprises a thread surface portion, wherein the guide device comprises an outer surface comprising a thread surface portion configured to engage with the corresponding thread surface portion of the inner surface of the male coupling body for locking the guide portion.

According to one embodiment, the guide device comprises a center portion extending in the male coupling body extension direction and a plurality of legs extending in a direction from the first extension direction towards the thread surface portion, forming lead-through channels between the legs, wherein the thread surface portion is formed on the outer ends of the legs.

According to one embodiment, the guide device comprises three legs.

According to one embodiment, the poppet device comprises a cylindrical hollow core comprising the first end of the spring device, wherein the guide device comprises a cylindrical hollow core comprising the second end of the spring device, wherein the poppet device and guide device are configured to matingly engage each other wherein the spring device is entirely enclosed within the poppet device and the guide device.

According to one embodiment, a male coupling unit for a hydraulic coupling device is provided, comprising a male coupling body comprising a hollow core comprising a male coupling body center axis extending in a male coupling body extension direction, wherein the male coupling body comprises an inner surface wherein the male coupling body further comprising a poppet valve device arranged in the hollow core; wherein the poppet valve device comprises a poppet device, a guide device, and a spring device, wherein a first end of the spring device is supported by the poppet device and a second end of the spring device is supported by the guide device, wherein the poppet device is movable in relation to the guide device along the male coupling body extension direction between an open and closed position upon compression and extension of the spring device respectively, wherein the guide device is locked in the male coupling body extension direction, wherein the inner surface comprises a thread surface portion, wherein the poppet device comprises a cylindrical hollow core comprising the first end of the spring device, wherein the guide device comprises a cylindrical hollow core comprising the second end of the spring device, wherein the poppet device and guide device are configured to matingly engage each other wherein the spring device is entirely enclosed within the poppet device and the guide device.

According to one embodiment, the guide device comprises a cylinder portion, wherein the inner diameter of the cylindrical hollow core of the poppet device is larger than the outer diameter of the cylinder portion of the guide portion, wherein the poppet device and guide device matingly engage each other by the guide device being partly inserted into the cylindrical hollow core of the poppet device.

According to one embodiment, the spring device comprises at least one spring.

According to one embodiment, the spring device comprises a plurality of springs.

According to one embodiment, a poppet sealing ring is provided in a circumferential groove of the poppet device.

According to one embodiment, the poppet sealing ring comprises a circumferential groove.

According to one embodiment, the poppet sealing ring is made of polyurethane.

According to one embodiment, a female coupling unit for a hydraulic coupling device is provided, comprising a female coupling body comprising a hollow core, wherein the female coupling body comprising a rear end and a front end, a sealing sleeve device, wherein the sealing sleeve device is supported by a spring device and movable in relation to the female coupling body between a closed and open position upon extension and compression of the spring device respectively, further comprising a female poppet device fixedly arranged to the rear end of the female coupling body in the hollow core and extending towards the front end of the female coupling body; wherein a rear sealing ring is provided along an inner circumferential surface of the sealing sleeve device and adapted to bear against and slide along a front end portion of the female poppet device during movement of the sealing sleeve device, wherein the rear sealing ring is configured to prevent flow of hydraulic fluid between the rear sealing ring and the female poppet device from a rear end of the female coupling body towards a front end of the female coupling body and enable flow of hydraulic fluid between the rear sealing ring and the female poppet device from a front end of the female coupling body towards a rear end of the female coupling body.

According to one embodiment, the rear sealing ring comprises an inner diameter, wherein the inner diameter is variable.

According to one embodiment, the rear sealing ring comprises a circumferential groove facing the rear end of the female coupling body, wherein the circumferential groove is configured to provide elasticity and enable the variation of the inner diameter.

According to one embodiment, a front sealing ring is provided along an inner circumferential surface of the sealing sleeve device at a front end of the sealing sleeve device, wherein the front sealing ring comprises an inner diameter, wherein the inner diameter is variable.

According to one embodiment, the front sealing ring comprises a circumferential groove facing the rear end of the female coupling body, wherein the circumferential groove is configured to provide elasticity and enable the variation of the inner diameter.

According to one embodiment, the rear sealing ring is made of polyurethane.

According to one embodiment, the front sealing ring is made of polyurethane.

According to one embodiment, a hydraulic coupling device is provided comprising a male coupling unit according to e.g. any of the embodiments described above in [0006]-[0016], and a female coupling unit according to e.g. any of the embodiments described above in [0017]-[0023].

According to one embodiment, the hydraulic coupling device, further comprises a holding block, a guiding ring, an expanding ring for fixedly arranging the female coupling unit to the holding block in an opening of the holding block, wherein the guiding ring comprises an outer surface comprising a thread surface portion configured to engage with a thread surface portion of a cylindrical portion of an opening of the holding block fixedly arranging the guiding ring to the holding block, wherein a seat is provided in the opening of the holding block for supporting the expanding ring, wherein an outer surface of the front end portion of the female coupling body comprises a circumferential groove comprising a groove seat, configured to receive the expanding ring, wherein the female coupling unit is adapted to be fixedly arranged to the holding block by being suspended between the guiding ring and the seat, wherein the expanding ring is arranged as a support between the female coupling unit and the seat.

According to one embodiment, a hydraulic coupling device is provided comprising a male coupling unit, a female coupling unit, a holding block, a guiding ring, and an expanding ring for fixedly arranging the female coupling unit to the holding block in an opening of the holding block, wherein the guiding ring comprises an outer surface comprising a thread surface portion configured to engage with a thread surface portion of the cylindrical portion of the opening of the holding block fixedly arranging the guiding ring to the holding block, wherein a seat is provided in the opening for supporting the expanding ring, wherein an outer surface of the front end of the female coupling body comprises a circumferential groove comprising a groove seat, configured to receive the expanding ring, wherein female coupling unit is adapted to be fixedly arranged to the holding block by being suspended between the guiding ring and the seat, wherein the expanding ring is arranged as a support between the female coupling unit and the seat.

According to one embodiment, the hydraulic coupling device further comprises a male coupling unit, e.g. as described in embodiments [0006]-[0016] above.

BRIEF DESCRIPTION OF DRAWINGS

The invention is now described, by way of example, with reference to the accompanying drawings, in which:

FIG. 3a shows a perspective front end view of a male coupling unit of a hydraulic coupling device according to one embodiment of the invention and according to FIG. 1-2.

FIG. 3b shows a perspective rear end view of a male coupling unit of a hydraulic coupling device according to FIG. 3a.

FIG. 3c shows a front end side view of a male coupling unit of a hydraulic coupling device according to FIG. 3a.

FIG. 3d shows a rear end side view of a male coupling unit of a hydraulic coupling device according to FIG. 3a.

FIG. 3e shows a side view of a male coupling unit of a hydraulic coupling device according to FIG. 3a.

FIG. 4a shows a perspective front end view of a female coupling unit of a hydraulic coupling device according to one embodiment of the invention.

FIG. 4b shows a perspective rear end view of a female coupling unit of a hydraulic coupling device according to FIG. 4a.

FIG. 4c shows a front end side view of a female coupling unit of a hydraulic coupling device according to FIG. 4a.

FIG. 4d shows a rear end side view of a female coupling unit of a hydraulic coupling device according to FIG. 4a.

FIG. 4e shows a side view of a male coupling unit of a hydraulic coupling device according to FIG. 3a.

DESCRIPTION OF EMBODIMENTS

Figures 1, 2:
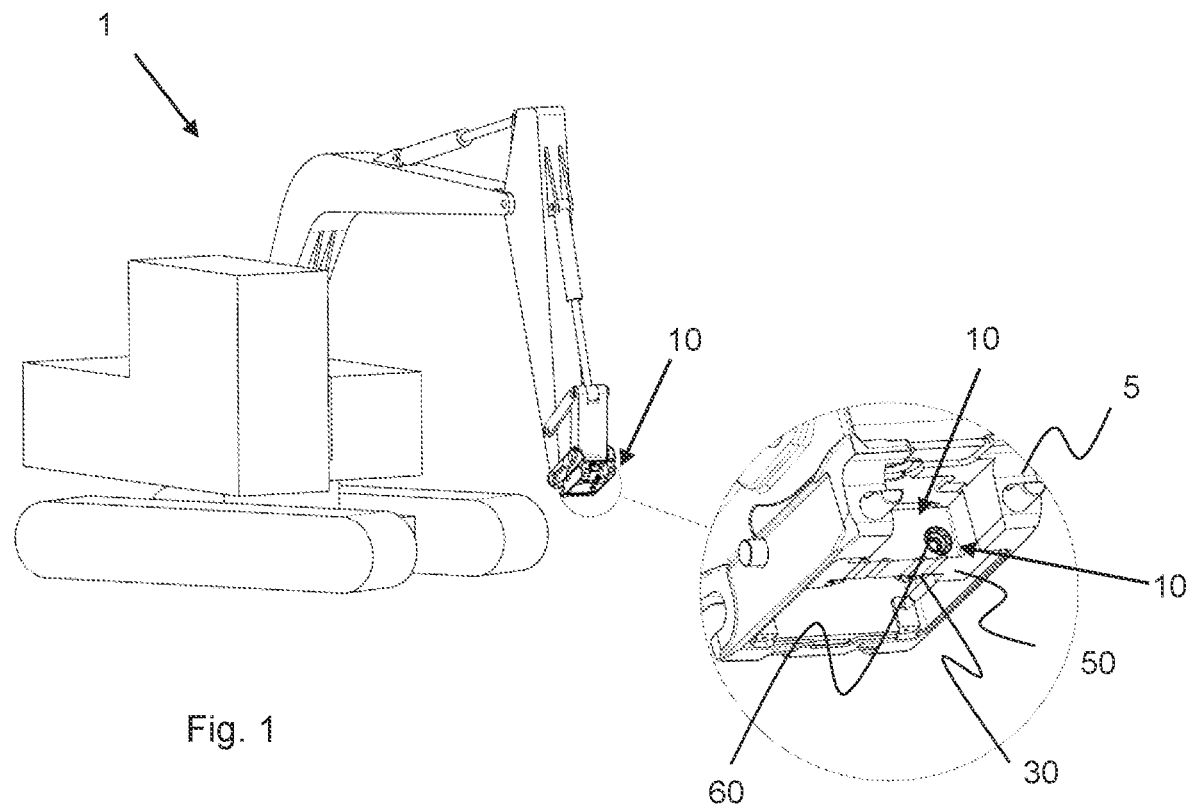
FIG. 1 shows a perspective view of a working machine with a quick coupler and a hydraulic coupling device for attaching and connecting a hydraulically operated tool thereto.
FIG. 2 shows an enlarged view of the quick coupler and the hydraulic coupling device according to the invention according to FIG. 1.

In the following, a detailed description of the invention will be given. In the drawing figures, like reference numerals designate identical or corresponding elements throughout the several figures. It will be appreciated that these figures are for illustration only and are not in any way restricting the scope of the invention.

FIG. 1 shows a perspective view of a working machine 1 with a quick coupler 5 and a hydraulic coupling device 10 according to one embodiment of the invention, for attaching and connecting a hydraulically operated tool thereto.

FIG. 2 shows an enlarged view of the quick coupler 5 and the hydraulic coupling device 10 connected to a holding block 50. According to one embodiment, the holding block 50 is arranged to the quick coupler 2. According to one embodiment, the holding block 50 is arranged to the quick coupler 5 via linear controls. According to one embodiment the holding block 50 is arranged to the quick coupler 2 via hydraulic cylinders. According to one embodiment, the holding block 50 is movable in relation to the quick coupler 5 during connection of the male 20 and female 30 coupling units of the hydraulic coupling device 10. As seen in FIG. 2, a female coupling unit 30 of the hydraulic coupling device 10 is arranged to the holding block by the aid of an expanding ring 60. An hydraulically operated tool (not shown) equipped with a male coupling unit 20 may then be attached to the quick coupler 5 and the male and female coupling units are brought into mating engagement with each other.

Figures 3A, 3B:
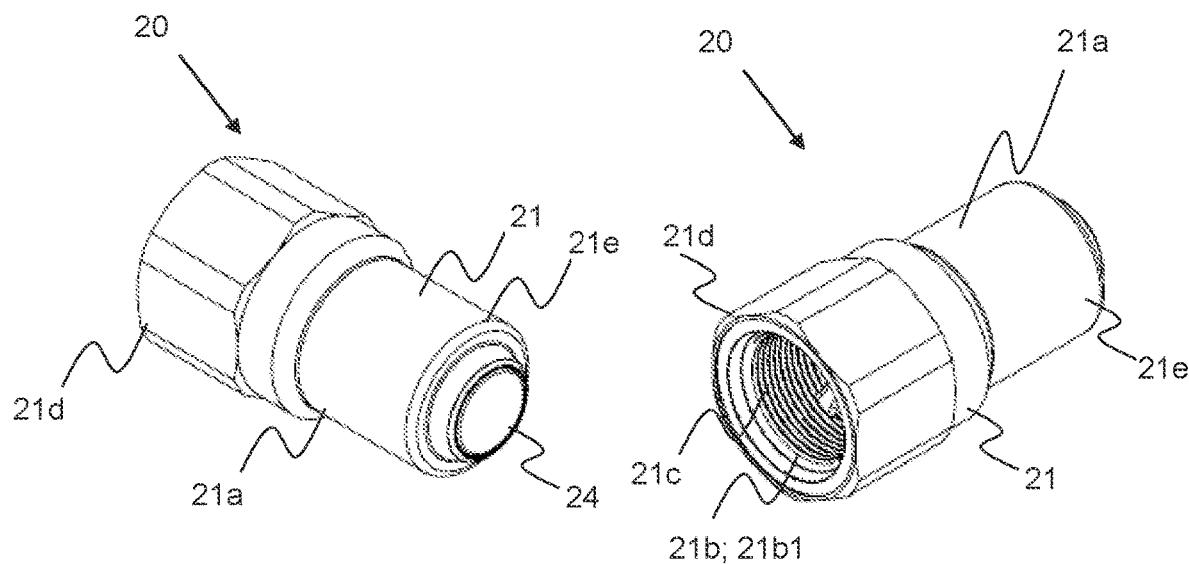

FIG. 3a shows a perspective front end view of a male coupling unit 20 of a hydraulic coupling device 10. The hydraulic coupling unit 20 comprises a male coupling body 21 further comprising an outer surface 21a. At the front end of the male coupling body poppet device 24 is arranged.

FIG. 3b shows a perspective rear end view of a male coupling unit 20 of a hydraulic coupling device 10. The male coupling unit 20 comprises a male coupling body 21, comprising a hollow core 21c and an inner surface 21b. The inner surface portion comprises a thread surface portion 21b1.

Figures 3C, 3D:
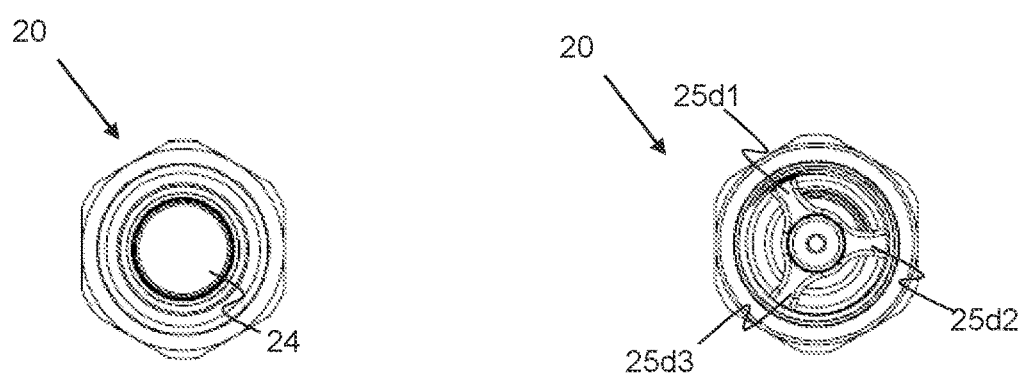

FIG. 3c shows a front end side view of a male coupling unit 20 of a hydraulic coupling device 10.

FIG. 3d shows a rear end side view of a male coupling unit 20 of a hydraulic coupling device 10. A guide device 25 is disclosed comprising a center portion and a plurality of radial legs 25d1, 25d2, 25d3 providing a lead-through for the hydraulic fluid.

Figure 3E:
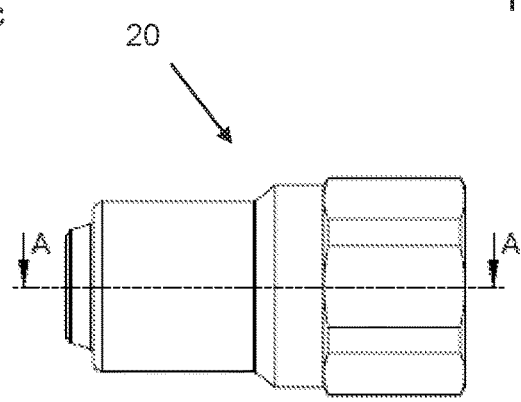

FIG. 3e shows a side view of a male coupling unit 20 of a hydraulic coupling device 10.

Figure 3F:
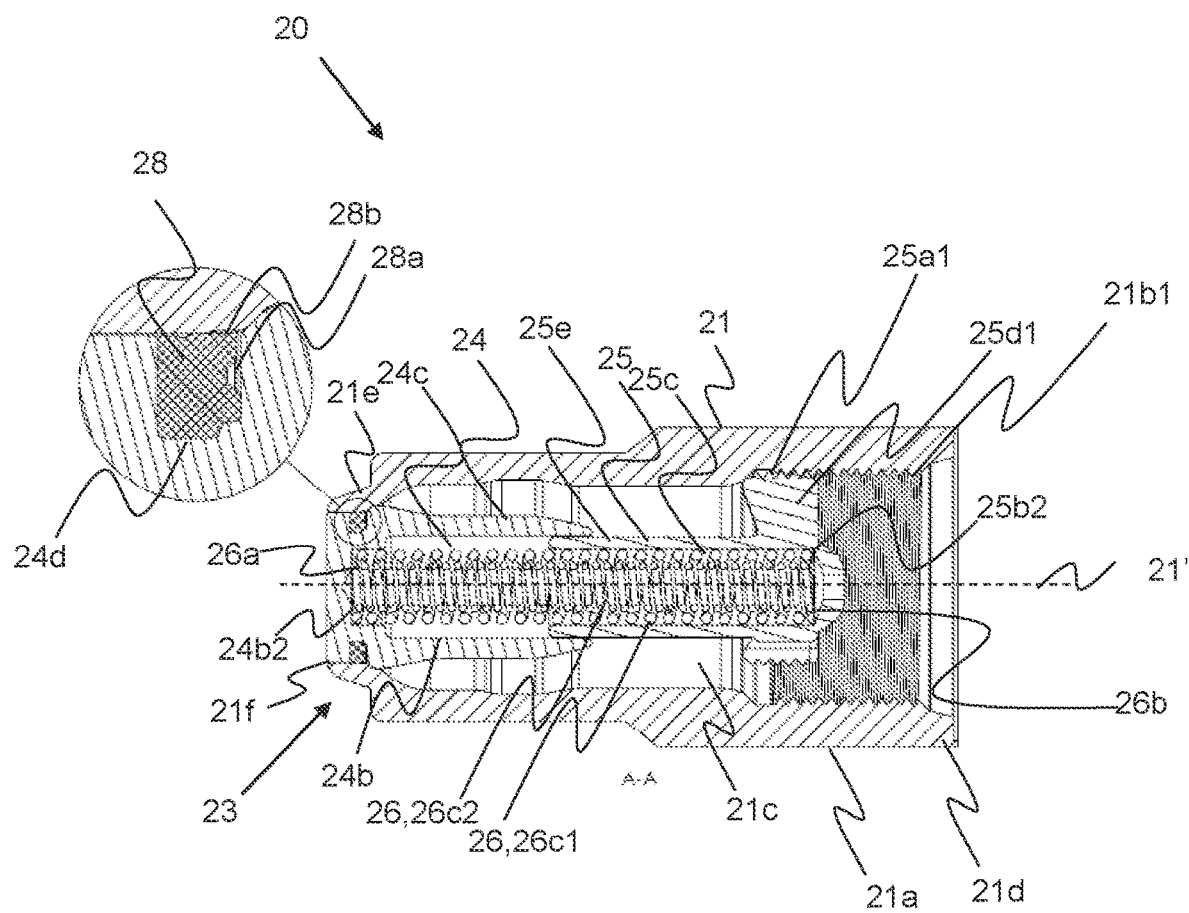
FIG. 3f shows a cross-section view of a male coupling unit along line A-A of FIG. 3e.

FIG. 3f shows a cross-section view of a male coupling unit 20 of a hydraulic coupling device 10 along line A-A of FIG. 3e. According to one embodiment, the hydraulic coupling device 10 comprises a male coupling unit 20, further comprising a male coupling body 21 comprising a hollow core 21c comprising a male coupling body center axis 21' extending in a male coupling body extension direction. According to one embodiment, the male coupling body extension direction is thus directed in both directions of the male coupling body center axis 21'. The male coupling body 21 comprises an outer surface 21a and an inner surface 21b. According to one embodiment, the male coupling body 21 comprises a poppet valve device 23 configured to seal the outside from the interior of the male coupling body 21 through opening 21f of the male coupling body 21 in a closed position, and open the outside from the interior of the male coupling body 21 through the opening 21f in an open position. The poppet valve device 23 comprises poppet device 24, a guide device 25 and a spring device 26, wherein a first end 26a of the spring device 26 is supported by the poppet device 24, wherein a second end 26b of the spring device 26 is supported by the guide device 25, wherein the poppet device 24 is movable in relation to the guide device 25 along the male coupling body extension direction between an open and closed position upon compression and extension of the spring device 26 respectively, wherein the guide device 25 is locked in the male coupling body extension direction, wherein the inner surface 21b of the male coupling body 21 comprises a thread surface portion 21b1, wherein the guide device 25 comprises an outer surface 25a comprising a thread surface portion 25a1 configured to engage with the corresponding thread surface portion 21b1 of the inner surface 21b of the male coupling body 21 for locking the guide device 25. According to one embodiment, the the thread surface portion 25a1 is configured to engage with the corresponding thread surface portion 21b1 of the inner surface 21b of the male coupling body 21 for locking the guide device 25 in a male coupling body extension direction. According to one embodiment, extension of the of spring device 26 comprises a relative movement from a compressed spring device 26 towards a relatively more extended spring device 26.

According to one embodiment, the poppet valve device 23 comprises a poppet sealing ring 28 provided in a circumferential groove 24d of the poppet device 24. FIG. 3f further discloses an enlarged view of the poppet sealing ring 28. According to one embodiment, the poppet sealing ring 28 comprises a circumferential groove 28a. According to one embodiment, the poppet sealing ring 28 comprises an outer diameter, wherein the outer diameter is variable. According to one embodiment, the poppet sealing ring 28 comprises a circumferential groove 28a facing the rear end portion 21d of the male coupling body 21, wherein the circumferential groove 28a is configured to provide elasticity and enable the variation of the outer diameter as well as providing a channel for hydraulic fluid which when filled with pressurized hydraulic fluid increases the outer diameter. According to one embodiment, the effect of an increased outer diameter corresponds to an increasing sealing force against a surface abutting or bearing against the poppet sealing ring 28, such as the inner surface 21*b* at the opening 21*f* of the male coupling body 21 in a closed position. According to one embodiment, the circumferential groove 28*a* is v-shaped. According to one embodiment, the poppet sealing ring 28 is configured to abut or bear against the male coupling body 21 with a higher force upon an increasing pressure of a hydraulic fluid within the male coupling body 21. According to one embodiment, the outer diameter is defined by a wedge-shaped portion 28*b*. According to one embodiment, the wedge-shaped portion 28*b* is shaped to provide a faster increase of the outer diameter in a direction from the rear end portion 21*d* to the front end portion 21*e* of the male coupling body 21 compared to a direction from the front end portion 21*e* to the rear end portion 21*d* of the male coupling body 21.

According to one embodiment, the poppet sealing ring 28 is made of polyurethane, also known as PUR.

According to one embodiment, the poppet valve device 23 is biased towards a closed position by the spring device 26. According to one embodiment, the guide device 25 comprises a center portion 25*e* extending in the male coupling body extension direction and a plurality of radial legs 25*d*1, 25*d*2, 25*d*3 extending in a direction from the male coupling body center axis 21' towards the thread surface portion 21*b*1. According to one embodiment, the radial legs 25*d*1, 25*d*2, 25*d*3 provides a lead-through for the hydraulic fluid between a front end 21*e* and a rear end 21*d* of the male coupling body 21. According to one embodiment, the radial legs 25*d*1, 25*d*2, 25*d*3 provides a lead-through for the hydraulic fluid between a front end 21*e* and a rear end 21*d* of the male coupling body 21 between the radial legs 25*d*1, 25*d*2, 25*d*3. According to one embodiment, the guide device 25 comprises three legs 25*d*1, 25*d*2, 25*d*3. As seen in FIG. 3*d*, according to one embodiment, the three legs 25*d*1, 25*d*2, 25*d*3 extend from the male coupling body center axis 21' with an interval of 120°. As seen in FIG. 3*d*, according to one embodiment, the three legs 25*d*1, 25*d*2, 25*d*3 extend from the male coupling body center axis 21' and are separated from each other by an angular distance of 120°. According to one embodiment, the plurality of radial legs 25*d*1, 25*d*2, 25*d*3, . . . , 25*dn* extend in a direction from the male coupling body center axis 21' towards the thread surface portion 21*b*1 and are separated from each other with an angular distance evenly distributed between the plurality of radial legs 25*d*1, 25*d*2, 25*d*3, 25*dn*. Thus, e.g. in the example of four radial legs, the radial legs are separated from each other with an angular distance of 90°. According to one embodiment, the plurality of radial legs 25*d*1, 25*d*2, 25*d*3, . . . , 25*dn* extend in a direction from the male coupling body center axis 21' towards the thread surface portion 21*b*1 and are separated from each other with an angular distance. According to one embodiment, the angular distance is unevenly distributed between the plurality of radial legs 25*d*1, 25*d*2, 25*d*3, . . . , 25*dn*.

According to one embodiment, the poppet device 24 comprises a cylindrical hollow core 24*c*, and outer surface 24*a* and an inner surface 24*b*. According to on embodiment, the cylindrical hollow core 24*c* of the poppet device 24 comprises the first end 26*a* of the spring device 26. According to one embodiment, the poppet device 24 forms a stop portion 24*b*2 of the inner surface 24*b* configured to support the first end 26*a* of the spring device 26. According to one embodiment, the guide device 25 comprises a cylindrical hollow core 25*c*, an outer surface 25*a* and an inner surface 25*b*. According to one embodiment, the cylindrical hollow core 25*c* of the guide device 25 comprises the second end 26*b*. According to one embodiment, the guide device 25 forms a stop portion 25*b*2 of the inner surface 25*b* configured to support the second end 26*b* of the spring device 26. According to one embodiment, the poppet device 24 and the guide device 25 matingly engage each other wherein the spring device 26 is entirely enclosed within the poppet device 24 and the guide device 25. According to one embodiment, the spring device 26 is entirely enclosed within the poppet valve device 23. According to one embodiment, center portion 25*e* of the guide device 25 comprises a cylinder portion 25*e*. According to one embodiment, an inner diameter of the cylindrical hollow core 24*c* of the poppet device 24 is larger than the outer diameter of the cylinder portion of the guide device 25, wherein the poppet device 24 and guide device 25 matingly engage each other by the poppet device 24 encompassing the guide portion 25. According to one embodiment, the poppet device 24 and guide device 25 matingly engage each other by a portion of the poppet device 24 overlaps a portion of the guide portion 25. According to one embodiment, the poppet device 24 and guide device 25 matingly engage each other by the guide device 25 being partly inserted into the cylindrical hollow core 24*c* of the poppet device 24. According to one embodiment, the spring device 26 comprises at least one spring 26*c*1. According to one embodiment, the spring device 26 comprises a plurality of springs 26*c*1, 26*c*2, i.e. at least two springs but comprising any number of springs. According to one embodiment, the plurality of springs 26*c*1, 26*c*2 enables the selection of a desired spring force for generating a sufficient closing force of the male coupling unit 20 for specific purposes preventing leakage of hydraulic fluid.

FIG. 4*a* shows a perspective front end view of a female coupling unit 30 of a hydraulic coupling device 10. The hydraulic coupling unit 30 comprises a female coupling body 31 further comprising an outer surface 31*a*. At the front end 31*e* of the female coupling body 3, a female poppet device 33 is shown.

FIG. 4*b* shows a perspective rear end view of a female coupling unit 30 of a hydraulic coupling device 10. The female coupling unit 30 comprises a female coupling body 31, comprising a hollow core 31*c* and an inner surface 31*b*.

FIG. 4*c* shows a front end side view of a female coupling unit 30 of a hydraulic coupling device 10.

FIG. 4*d* shows a rear end side view of a female coupling unit 30 of a hydraulic coupling device 10. According to one embodiment, the rear end portion 31*d* comprises a plurality of orifices 35*d*1, 35*d*2, 35*d*3, 35*d*4 providing lead-throughs for the hydraulic fluid.

FIG. 4*e* shows a side view of a female coupling unit 30 of a hydraulic coupling device 10.

Figure 4F:
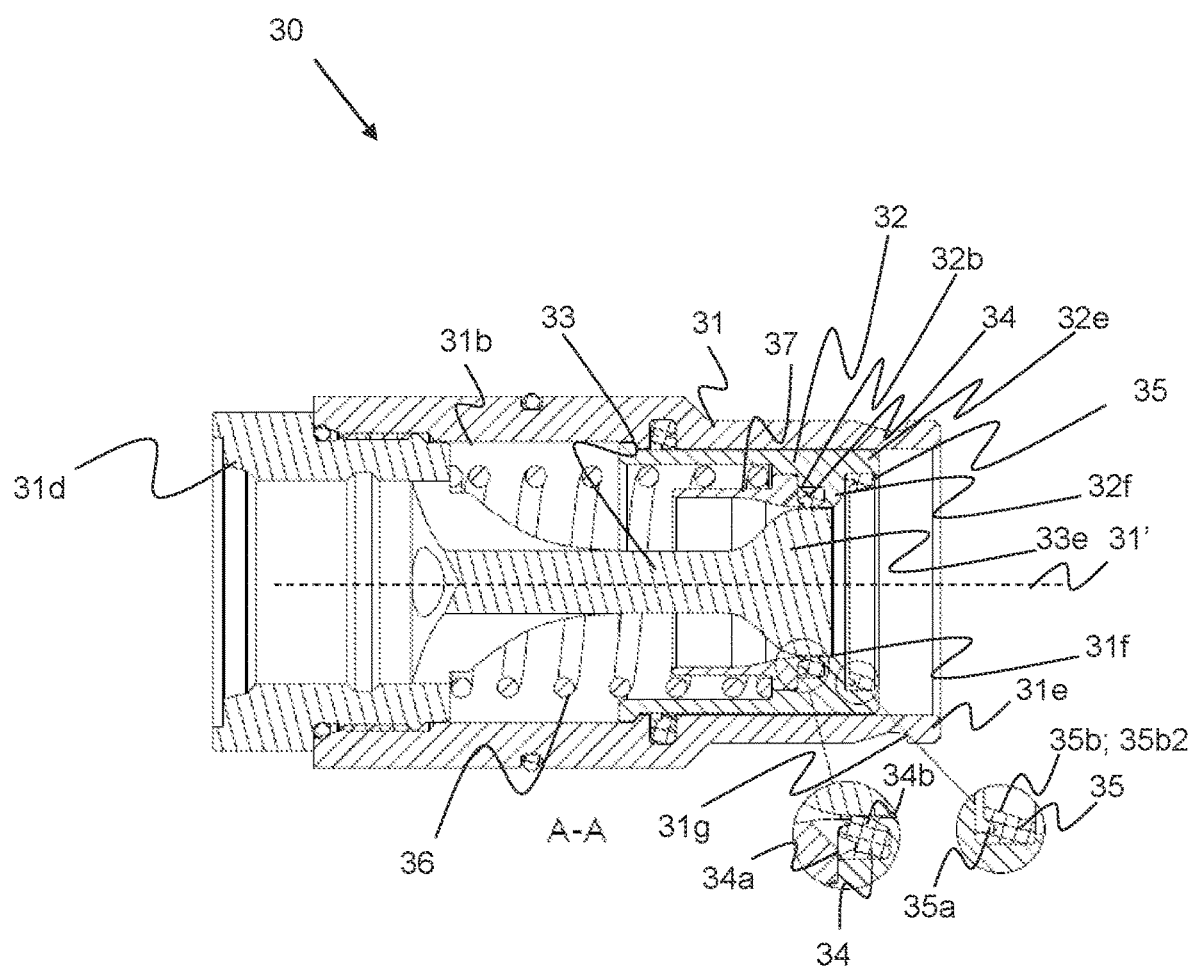
FIG. 4f shows a cross-section view of a male coupling unit along line A-A of FIG. 4e.

FIG. 4*f* shows a cross-section view of a female coupling unit along line A-A of FIG. 4*e*. FIG. 4*f* further discloses enlarged views of a rear sealing ring 34 and a front sealing ring 35. According to one embodiment, the female coupling unit 30 further comprising a female coupling housing 31 comprising a rear end portion 31*d* and a front end portion 31*e*, a sealing sleeve device 32, wherein the sealing sleeve device 32 is supported by a spring device 36 and movable in relation to the female coupling housing 31 between a closed and open position upon extension and compression of the spring device 36 respectively. According to one embodiment, extension of the of spring device 36 comprises a relative movement from a compressed spring device 36 towards a relatively more extended spring device 36. According to one embodiment, a rear end portion 31*d* comprising a female poppet device 33 extending along a female coupling body center axis 31' of the female coupling body 31 towards the front end 31*e* of the female coupling body 31, wherein a rear sealing ring 34 is provided along an inner circumferential surface 32b of the sealing sleeve device 32 and adapted to abut or bear against and slide along a front end portion of the female poppet device 33 during movement of the sealing sleeve device 32, wherein the rear sealing ring 34 is configured to prevent flow of hydraulic fluid between the rear sealing ring 34 and the female poppet device 33 from a rear end 31d of the female coupling housing 31 towards a front end 31e of the female coupling housing 31 and enable flow of hydraulic fluid between the rear sealing ring 34 and the female poppet device 33 from a front end 31e of the female coupling housing towards a rear end 31d of the female coupling housing. According to one embodiment, a desired effect of this is feature is that it enables high pressure of the hydraulic fluid in the male coupling body 21, i.e. in a hydraulically operated work tool connected to the male coupling body to be reduced in a controlled manner by allowing hydraulic fluid to enter the female coupling body 31 during connection of the male 21 and female 31 coupling body. According to one embodiment, the rear sealing ring 34 functions as a check valve or as a safety valve. The alternative, as present in the background art, is that rear sealing rings consists of o-rings which essentially provides an equal sealing capability in both directions whereby the pressure of the hydraulic fluid in the male coupling body 21 may force the o-ring out of position to eventually enter the hydraulic fluid, causing malfunction of the hydraulic coupling device and/or the hydraulically operated work tool. According to one embodiment, the rear sealing ring 34 is held in place in the inner circumferential surface 32b by a seat 32f of the sealing sleeve device 32 and a locking ring 37. According to one embodiment, the sealing sleeve device 32 comprising the rear sealing ring 34 and the female poppet device 33 are configured to engage so that during a closed position, the outside is sealed from the interior of the female coupling body 31 through an opening 31f, and during an open position, the outside is open from the interior of the female coupling body 31 through the opening 31f.

According to one embodiment, the rear sealing ring 34 comprises an inner diameter, wherein the inner diameter is variable. According to one embodiment, the rear sealing ring 34 comprises a circumferential groove 34a facing the rear end portion 31d of the female coupling body 31, wherein the circumferential groove 34a is configured to provide elasticity and enable the variation of the inner diameter as well as providing a channel for hydraulic fluid which when filled with pressurized hydraulic fluid reduces the inner diameter. According to one embodiment, the effect of a reduced inner diameter corresponds to an increasing sealing force against a surface abutting or bearing against the rear sealing ring 34, such as the female poppet device 33 in a closed position. According to one embodiment, the circumferential groove 34a is v-shaped. According to one embodiment, the rear sealing ring 36 is configured to bear against the female poppet device 33 with a higher force upon an increasing pressure of an hydraulic fluid within the female coupling housing 31. According to one embodiment, the inner diameter is defined by a wedge-shaped portion 34b. According to one embodiment, the wedge-shaped portion 34b is shaped to provide a faster reduction of the inner diameter in a direction from the rear end portion 31d to the front end portion 31e of the female coupling housing 31 compared to a direction from the front end portion 31e to the rear end portion 31d of the female coupling body 31.

According to one embodiment, a front sealing ring 35 is provided along an inner circumferential surface 32b of the sealing sleeve device 32 at a front end portion 32e of the sealing sleeve device 32, wherein the front sealing ring 35 comprises an inner diameter, wherein the inner diameter is variable. According to one embodiment, the front sealing ring 35 comprises a circumferential groove 35a facing the rear end portion 31d of the female coupling housing 31, wherein the circumferential groove 35a is configured to provide elasticity and enable the variation of the inner diameter of the outer sealing ring 35 as well as providing a channel for hydraulic fluid which when filled with pressurized hydraulic fluid reduces the inner diameter. According to one embodiment, the effect of a reduced inner diameter corresponds to an increasing sealing force against a surface abutting or bearing against the front sealing ring 35, such as the outer surface 21a of the male coupling body 21 when the male coupling body 21 has been inserted into the female coupling body 31 as further described in connection to FIGS. 5a-5b. According to one embodiment, the circumferential groove 35a is v-shaped. According to one embodiment, the front sealing ring 35 is configured to bear against the outer surface 21b of the male coupling body 21 with a higher force upon an increasing pressure of an hydraulic fluid within the female coupling housing 31 or alternatively, upon an increasing pressure within the combined housing of the female coupling housing 31 and the male coupling housing 21 when connected together. According to one embodiment, the inner diameter is defined by a circumferential wedge-shaped portion 35b. According to one embodiment, the inner diameter is defined by a circumferential leg portion 35b2 extending from a cylinder portion 35c with an angle therebetween defined by the v-shaped circumferential groove 35a. According to one embodiment, the circumferential leg portion 35b2/wedge-shaped portion 35b is shaped to provide a faster reduction of the inner diameter in a direction from the rear end portion 31d to the front end portion 31e of the female coupling housing 31 compared to a direction from the front end portion 31e to the rear end portion 31d of the female coupling housing 31.

According to one embodiment, the rear sealing ring 34 is made of polyurethane, also known as PUR.

According to one embodiment, the front sealing ring 35 is made of polyurethane, also known as PUR.

Figure 5A:
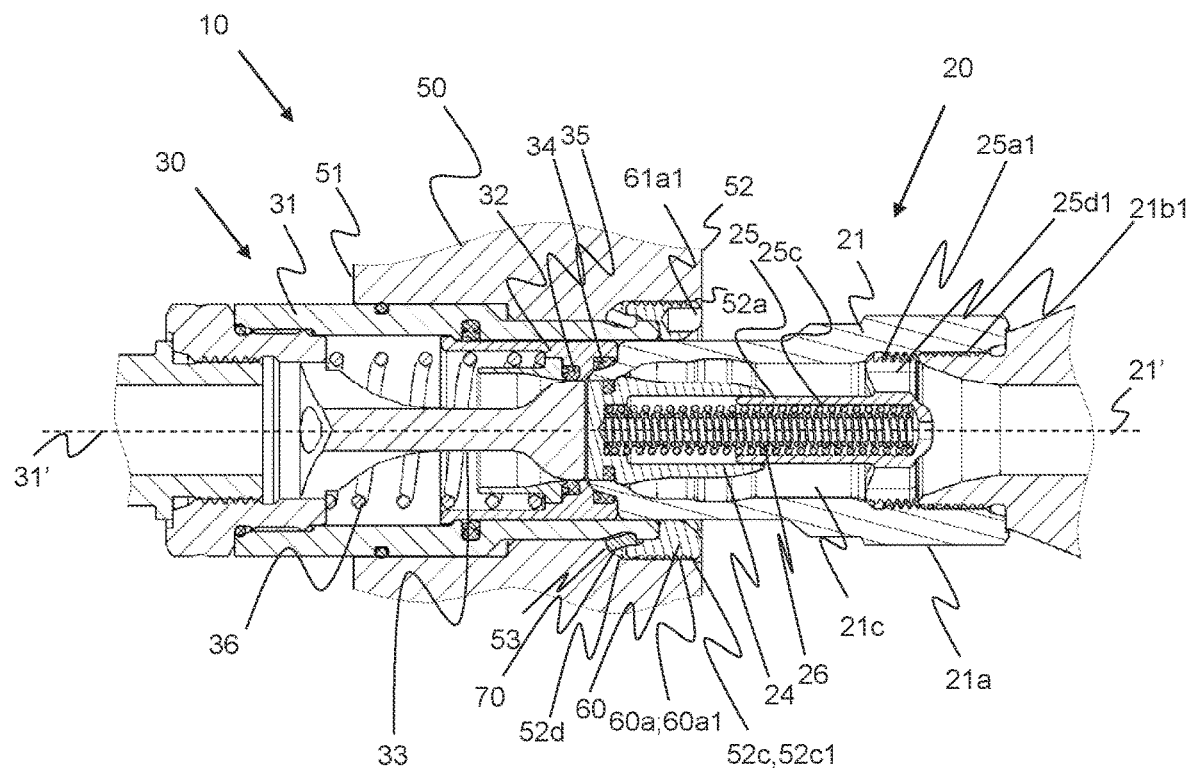
FIG. 5a shows a cross-section side view of a hydraulic coupling device in a closed position.

FIG. 5a shows a cross-section side view of a hydraulic coupling device 10, comprising a male coupling unit 20 and a female coupling unit 30 in a closed position. The male coupling unit 20 has been introduced into the female coupling part 30 whereby the male coupling body center axis 21' has been aligned with the female coupling body center axis 31'. A front end portion 21d of the male coupling body 21 abuts the sealing sleeve device 32, and the female poppet device 33 abuts the poppet device 24, without any pressure applied to overcome the spring forces of spring device 36 and spring device 26 which thereby remain in an extended position. Hereby, the male coupling unit 20 and the female coupling unit 30 is in a closed position respectively, wherein no hydraulic fluid within the male coupling body 20 and/or the female coupling body 30 may exit their respective bodies or interiors through openings 21f and 31f respectively.

According to one embodiment, as seen in FIG. 5a, the hydraulic coupling device 10 further comprises a holding block 50, a guiding ring 60, and an expanding ring 70 for fixedly arranging the female coupling unit 30 to the holding block 50. According to one embodiment, the hydraulic coupling device 10 comprises the female coupling unit 30, a holding block 50, a guiding ring 60, and an expanding ring 70 for fixedly arranging the female coupling unit 30 to the holding block 50. The female coupling body 31 is inserted from a female coupling body insertion side 51 of the holding block 50, and the male coupling body 21 is inserted from a male coupling body insertion side 52 of the holding block 50. According to one embodiment, the holding block 50 on the male coupling body insertion side 52 comprises an opening 52a of larger diameter than the front end portion 31e of the female coupling body 31. The opening 52a comprises a cylindrical portion 52c and a conical portion 52d with a decreasing diameter towards the female coupling body insertion side 51, ending in a seat 53. According to one embodiment, the cylindrical portion 52c of the opening 52a comprises a thread surface 52c1. According to one embodiment, the guiding ring 60 comprises an outer surface 60a comprising a thread surface portion 60a1 configured to engage with the thread surface portion 52c1 of the cylindrical portion 52c of the opening 52a. According to one embodiment, the front end of the guiding ring 60 is provided with a plurality of openings 61a1, 61a2, 61a3, 61a4, 61a5, 61a6 adapted to receive a tool comprising corresponding pins to be inserted into the holes and engage with the guiding ring 60 to enable a screwing motion of the guiding ring 60. According to one embodiment, the openings 61a1, 61a2, 61a3, 61a4, 61a5, 61a6 are circumferentially arranged on the front end of the guiding ring 60. According to one embodiment, the holes are circular. According to one embodiment, the guiding ring 60 is essentially cylinder shaped, comprising a hollow core having an inner wall of varying diameter. A rear end of the guiding ring is adapted to be inserted into the opening 52a and face the female coupling body insertion side 51. At the rear end of the guiding ring 60 the rear inner diameter is initially larger than the diameter of the front end of the female coupling body 31. The space between the female coupling body 31 and the inner wall of the guiding ring 60 forms a cylindrical guiding. The rear inner diameter decreases in a first step forming a cylindrical guiding seat, which according to one embodiment, may be conically shaped. The inner diameter then decreases in a second step forming a second seat, essentially corresponding to the outer diameter of the female coupling body 31 and the male coupling body 21. According to one embodiment, the expanding ring 70 has the shape of a part of a cone, wherein the rear end of the expanding ring 70 has a larger diameter than the front end of the expanding ring. The expanding ring 70 is configured to be flexible and biased in a radially outward direction upon compression radially inward. According to one embodiment the outer surface 31a of the front end 31e of the female coupling body 31 comprises a circumferential groove 31f configured to receive the expanding ring 70. According to one embodiment, the circumferential groove 31f provides the outer surface 31a of the female coupling body 31 the shape of a part of cone corresponding to the shape of the expanding ring 70, wherein the diameter of the outer surface 31a of the female coupling body 31 decreases towards the front end of the female coupling body 31. At the end of the groove 31f, the diameter abruptly increases to form a groove seat 31g for the expanding ring 70.

According to one embodiment, mounting of the hydraulic coupling device 10 is carried out by first inserting the female coupling body 31 into in the holding block 50 from the female coupling body insertion side 51. The expanding ring 70 is provided over the front end portion 31e of the female coupling portion 31 by inserting the expanding ring 70 from the male coupling body insertion side 52 in the opening 52a. Thereafter the guiding ring 60 is screwed into the opening 52a, until contacting the expanding ring 70 whereby the expanding ring 70 is pressed into the seat 53 of the holding block by guidance of the conical portion of the opening 52a. During further screwing of the guiding ring 60, the expanding ring 70 is further guided by the cylindrical guiding to get further compressed and eventually engage with the circumferential groove 31f and the groove seat 31g. Upon further screwing of the guiding ring 60, the second seat of the guide ring 60 contacts or engages the front end of the female coupling body 31 whereby the female coupling body is pressed in a rearward direction towards the female coupling body insertion side 52, with the expanding ring 70 providing a support or holder-on or lock or stop for the female coupling body 31 preventing a release of the female coupling body 31 in this direction towards the female coupling body insertion side 51.

Figure 5B:
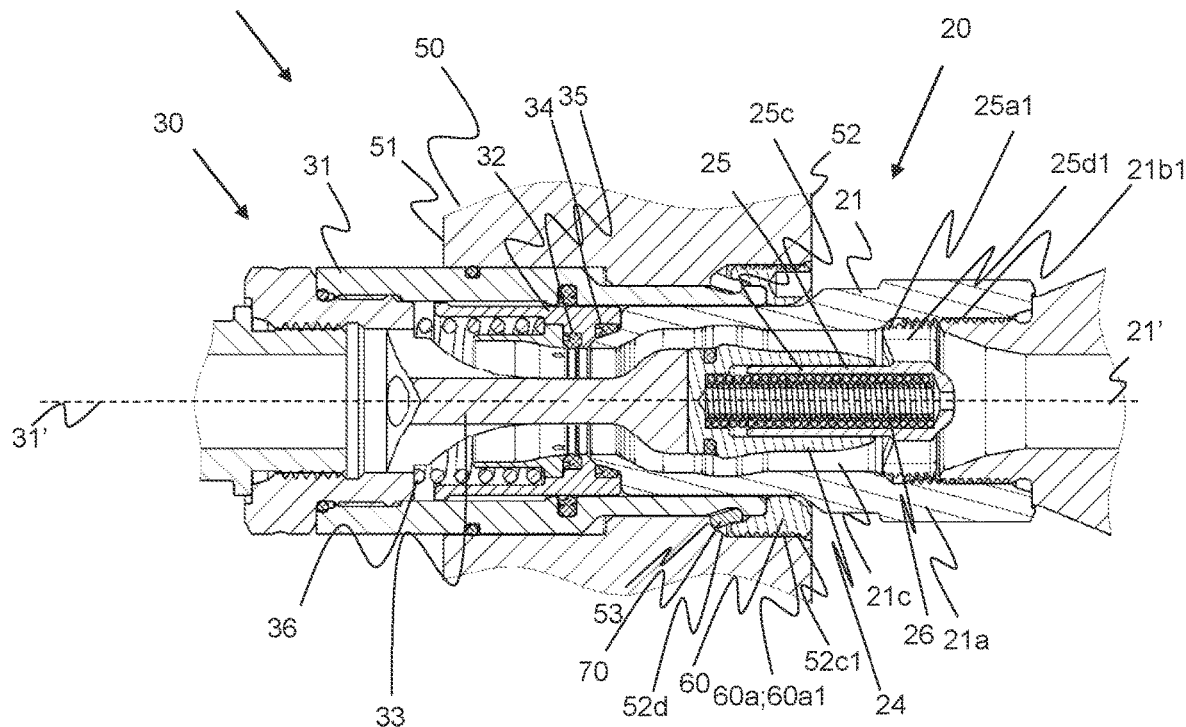
FIG. 5b shows a cross-section side view of a hydraulic coupling device in an open position.

FIG. 5b shows a cross-section side view of a hydraulic coupling device 10 in an open position. The male coupling unit 20 has been further introduced into the female coupling unit 30 whereby the spring forces of springs 26 and 36 have been overcome compressing the springs 26, 36. During the entire movement from a closed to an open position, the poppet device 24 and the guide device 25 matingly engage each other, providing a guidance and preventing tilting of the parts. Further, in the open position, a channel, or opening is created between the poppet device 24 and in particular, the poppet sealing ring 28 and the inner surface 21b of the male coupling body 21. Additionally a channel, or opening is created between the female poppet device 33 and the inner surface of the sealing sleeve device 32 and in particular the rear sealing ring 34. As the female poppet device 33 is inserted into the male coupling body 21 in an open position, a channel, or opening is further provided between the female poppet device 33 and the inner surface 21b of the male coupling body 21. The increasing diameter of the female poppet portion 33 towards a front end portion 31e of the female coupling body 31 corresponds to an increasing diameter of the inner surface portion 21b of the male coupling body 21 in a towards a rear end portion 21d of the male coupling body 21. Hydraulic fluid within the male coupling body 21 and/or the female coupling body 31 may exit their respective bodies or interiors and enter the other of the male or female coupling body 21, 31. The front sealing ring 35 provides a seal in the interface between the male coupling body 21 and the female coupling body 31 preventing leakage of hydraulic fluid within the male coupling body 20 and/or the female coupling body 30.

A preferred embodiment of a male coupling unit 20, a female coupling unit 30, a hydraulic coupling device 10 according to the invention has been described. However, the person skilled in the art realizes that this can be varied within the scope of the appended claims without departing from the inventive idea.

All the described alternative embodiments above or parts of an embodiment can be freely combined without departing from the inventive idea as long as the combination is not contradictory.

The invention claimed is:

1. A hydraulic coupling device comprising a female coupling unit comprising a female coupling body, a holding block, a guiding ring, and an expanding ring for fixedly arranging the female coupling unit to the holding block 50 in an opening of the holding block, wherein the guiding ring comprises an outer surface comprising a thread surface portion configured to engage with a thread surface portion of a cylindrical portion of the opening of the holding block for fixedly arranging the guiding ring to the holding block, wherein a seat is provided in the opening for supporting the expanding ring, wherein an outer surface of a front end of the female coupling body comprises a circumferential groove comprising a groove seat, configured to receive the expanding ring, wherein the female coupling unit is adapted to be fixedly arranged to the holding block by being suspended between the guiding ring and the seat, wherein the expanding ring is arranged as a support between the female coupling unit and the seat.

2. The hydraulic coupling device according to claim 1, further comprising a male coupling unit.

3. The hydraulic coupling device according to claim 1, wherein the female coupling body is adapted to be inserted from a female coupling body insertion side of the holding block, wherein a male coupling body of a male coupling unit is adapted to be inserted from a male coupling body insertion side of the holding block.

4. The hydraulic coupling device according to claim 3, wherein the holding block on the male coupling body insertion side comprises an opening, wherein the opening has a diameter that is larger than a diameter of the front end of the female coupling body.

5. The hydraulic coupling device according to claim 4, wherein the opening comprises the cylindrical portion and a conical portion with a decreasing diameter towards the female coupling body insertion side, ending in the seat.

6. The hydraulic coupling device according to claim 1, wherein the front end of the guiding ring is provided with a plurality of openings, adapted to receive a tool comprising corresponding pins to be inserted into the plurality of openings and engage with the guiding ring to enable a screwing motion of the guiding ring.

7. The hydraulic coupling device according to claim 6, wherein the plurality of openings are circular.

8. The hydraulic coupling device according to claim 1, wherein the guiding ring is cylinder shaped, and includes a hollow core having an inner wall of varying diameter.

9. The hydraulic coupling device according to claim 1, wherein a rear end of the guiding ring is adapted to be inserted into the opening and face the female coupling body insertion side.

10. The hydraulic coupling device according to claim 9, wherein at the rear end of the guiding ring, a rear inner diameter is initially larger than a diameter of the front end of the female coupling body.

11. The hydraulic coupling device according to claim 1, wherein the space between the female coupling body and the inner wall of the guiding ring forms a cylindrical guiding, wherein the rear inner diameter decreases in a first conically shaped step forming a cylindrical guiding seat, wherein the inner diameter further decreases in a second step forming a second seat, essentially corresponding to the outer diameter of the female coupling body and the male coupling body.

12. The hydraulic coupling device according to claim 1, wherein the expanding ring has a shape of a part of a cone, wherein a rear end of the expanding ring has a larger diameter than a front end of the expanding ring.

13. The hydraulic coupling device according to claim 1, wherein the expanding ring is configured to be flexible and biased in a radially outward direction upon compression radially inward.

14. The hydraulic coupling device according to claim 1, wherein the circumferential groove of the female coupling body the shape of a part of cone corresponding to the shape of the expanding ring, wherein the diameter of the outer surface of the female coupling body decreases towards the front end of the female coupling body, wherein at the end of the groove the diameter abruptly increases to form a groove seat for the expanding ring.

15. A method of mounting the hydraulic coupling device according to claim 1, comprising the steps:
- inserting the female coupling body into the holding block from a female coupling body insertion side,
- providing the expanding ring over a front end portion of the female coupling portion by inserting the expanding ring from a male coupling boy body insertion side in the opening,
- screwing the guiding ring into the opening until contacting the expanding ring is pressed into the seat of the holding block by guidance of a conical portion of the opening,
- further screwing of the guiding ring whereby the expanding ring is further guided by the cylindrical guiding formed by the space between the female coupling body and the inner wall of the guiding ring, to get further compressed and eventually engage with the circumferential groove and the groove seat,
- further screwing of the guiding ring, whereby a second seat of the guide ring contacts or engages the front end of the female coupling body whereby the female coupling body is pressed in a rearward direction towards the female coupling body insertion side, with the expanding ring providing a support or holder-on or lock or stop for the female coupling body preventing a release of the female coupling body in this direction towards the female coupling body insertion side.

\* \* \* \* \*